(12) United States Patent
Ventura et al.

(10) Patent No.: US 10,409,696 B2
(45) Date of Patent: Sep. 10, 2019

(54) SCALABLE DATA STORAGE POOLS

(71) Applicant: Microsoft Technology Licensing, LLC, Redmond, WA (US)

(72) Inventors: Ashley P. Ventura, Duvall, WA (US); Tarun Ramani, Redmond, WA (US); Karan Mehra, Sammamish, WA (US); Shiv Kumar Rajpal, Sammamish, WA (US); Sarosh C. Havewala, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 15/589,500

(22) Filed: May 8, 2017

(65) Prior Publication Data
US 2018/0067829 A1 Mar. 8, 2018

Related U.S. Application Data

(63) Continuation of application No. 14/485,497, filed on Sep. 12, 2014, now Pat. No. 9,678,839.

(51) Int. Cl.
*G06F 11/00* (2006.01)
*G06F 11/20* (2006.01)
(Continued)

(52) U.S. Cl.
CPC ........ *G06F 11/201* (2013.01); *G06F 11/0727* (2013.01); *G06F 11/2023* (2013.01);
(Continued)

(58) Field of Classification Search
CPC .............. G06F 11/201; G06F 11/2094; G06F 11/0727; G06F 11/2023; G06F 11/2089; G06F 2201/85; H04L 67/1097
(Continued)

(56) References Cited

U.S. PATENT DOCUMENTS 7,865,596 B2  1/2011  Grosner et al.
8,090,792 B2  1/2012  Dubnicki et al.
(Continued)

FOREIGN PATENT DOCUMENTS

CN   102253869 A   11/2011
CN   102521063 A   6/2012
(Continued)

OTHER PUBLICATIONS

Wikipedia "data pool" page from date Nov. 1, 2013, retrieved using the Way Back Machine from https://web.archive.org/web/20131101125246/https://en.wikipedia.org/wiki/Data_pool (Year: 2013).*
(Continued)

*Primary Examiner* — Yair Leibovich
(74) *Attorney, Agent, or Firm* — Workman Nydegger

(57) ABSTRACT

Scalable data storage techniques are described. In one or more implementations, data is obtained by one or more computing devices that describes fault domains in a storage hierarchy and available storage resources in a data storage pool. Operational characteristics are ascertained, by the one or more computing devices, of devices associated with the available storage resources within one or more levels of the storage hierarchy. Distribution of metadata is assigned by the one or more computing devices to one or more particular data storage devices within the data storage pool based on the described fault domains and the ascertained operational characteristics of devices within one or more levels of the storage hierarchy.

20 Claims, 9 Drawing Sheets

(51) Int. Cl.
*H04L 29/08* (2006.01)
*G06F 11/07* (2006.01)

(52) U.S. Cl.
CPC ...... *G06F 11/2089* (2013.01); *G06F 11/2094* (2013.01); *H04L 67/1097* (2013.01); *G06F 2201/85* (2013.01)

(58) Field of Classification Search
USPC ........................................................ 714/4.1
See application file for complete search history.

(56) References Cited

U.S. PATENT DOCUMENTS

| | | | |
|---|---|---|---|
| 8,495,010 B2 | 7/2013 | Moore et al. | |
| 8,495,111 B1 | 7/2013 | Wang et al. | |
| 8,583,893 B2 | 11/2013 | Pruthi et al. | |
| 8,671,132 B2 | 3/2014 | Carlson et al. | |
| 8,706,946 B2 | 4/2014 | Coronado et al. | |
| 8,793,290 B1 | 7/2014 | Pruthi et al. | |
| 8,806,154 B1 | 8/2014 | Gupta et al. | |
| 9,244,976 B1* | 1/2016 | Zhang | G06F 16/2453 |
| 2005/0120025 A1* | 6/2005 | Rodriguez | G06F 16/21 |
| 2005/0192991 A1 | 9/2005 | Nomoto et al. | |
| 2006/0106898 A1* | 5/2006 | Frondozo | G06F 11/1435 |
| 2007/0156957 A1 | 7/2007 | Machardy et al. | |
| 2008/0005191 A1 | 1/2008 | Lashley et al. | |
| 2008/0052293 A1 | 2/2008 | Coverston et al. | |
| 2008/0059731 A1 | 3/2008 | Dawson et al. | |
| 2011/0213886 A1 | 9/2011 | Kelkar et al. | |
| 2013/0667346 | 3/2013 | Rosenstein et al. | |
| 2013/0145091 A1 | 6/2013 | Klemm et al. | |
| 2014/0149663 A1 | 5/2014 | Golander et al. | |
| 2014/0181039 A1 | 6/2014 | Golander et al. | |
| 2014/0215272 A1 | 7/2014 | Bauer et al. | |
| 2017/0192864 A1* | 7/2017 | Taylor | G06F 11/2082 |

FOREIGN PATENT DOCUMENTS

| | | |
|---|---|---|
| JP | 2008518284 A | 5/2008 |
| JP | 2009163664 A | 7/2009 |
| JP | 2009529295 A | 8/2009 |
| RU | 108662 U1 | 9/2011 |

OTHER PUBLICATIONS

"International Preliminary Report on Patentability Issued in PCT Application No. PCT/US2015/049548", dated Jul. 28, 2016, 6 Pages.

"Archived—Xsan: How to Determine Available Capacity", Retrieved on: Aug. 26, 2014, Available at: <http://suport.apple.com/kb/HT3220?viewlocale=en_US&locale=en_US&locale=en_US>, Jul. 13, 2012, 2 pages.

"Object Model" Retrieved on: Aug. 26, 2014, Available at: <http://msdn.microsoft.com/en-us/library/windows/hardware/dn342890%28v=vs.85%29.aspx>, 2 pages.

Office Action cited in U.S. Appl. No. 14/485,497 dated Oct. 25, 2016.

Office Action cited in U.S. Appl. No. 14/485,497 dated Apr. 1, 2016.

"Notice of Allowance Issued in U.S. Appl. No. 14/485,497", dated Feb. 15, 2017, 11 Pages.

"International Search Report & Written Opinion Issued in PCT Application No. PCT/US2015/049548", dated Dec. 14, 2015, 12 Pages.

"First Office Action Issued in Chinese Patent Application No. 201580049228.2", dated Mar. 14, 2019, 14 Pages.

"Office Action Issued in Russian Patent Application No. 2017107276", dated Apr. 11, 2019, 6 Pages. (W/o English Translation).

"Office Action Issued in Japanese Patent Application No. 2017-511880", dated Jul. 3, 2019, 6 Pages.

* cited by examiner

300

302
Obtain data that describes fault domains in a storage hierarchy and available storage resources in a data storage pool

304
Ascertain operational characteristics of devices associated with the available storage resources within one or more levels of the storage hierarchy

306
Health of the device

308
Data connection type

310
Media Type

312
How used

314
Current Metadata Status

316
Assign distribution of metadata to one or more particular data storage devices within the data storage pool based on the described fault domains and ascertained operational characteristics of devices within one or more levels of the storage hierarchy

*Fig. 3*

602
Formatting a plurality of data storage devices using a plurality of threads simultaneously by one or more computing devices

604
Select one or more data storage devices for use in storing metadata for the data storage pool

606
Add a plurality of data storage devices to the data storage pool via a single transaction by the one or more computing devices

608
Updating the metadata by the one or more computing devices to address the added plurality of storage devices

610
Assign distribution of metadata to one or more particular data storage devices within the data storage pool based on ascertained operational characteristics of the data storage devices within the data storage pool

612
Distributing the metadata to the one or more particular data storage devices according to the assigned distribution sequentially, one at a time

*Fig. 6*

800

802
Receiving an indication by one or more computing devices to rebalance distribution of metadata in a data storage pool

804
Obtain data that describes resiliency constraints specified for the data storage pool

806
Assign redistribution of metadata to one or more particular data storage devices within the data storage pool based on the described resiliency constraints

*Fig. 8*

SCALABLE DATA STORAGE POOLS

CROSS-REFERENCE TO RELATED APPLICATIONS

This application is a continuation of U.S. patent application Ser. No. 14/485,497 filed on Sep. 12, 2014, entitled "Scalable Data Storage Pools," and which application is expressly incorporated herein by reference in its entirety.

BACKGROUND

The pervasiveness of data storage "in the cloud" by a data center continues to increase. Web services, for instance, may be configured to store data remotely as a part of a network such that this data may be readily accessed by a variety of different devices, such as to support operations of the web service and even to act as a sole purpose for the web service.

Techniques have been developed to manage data in data centers through use of data storage pools. Data storage pools are typically formed as collections of data storage devices that are configured for specific data storage tasks, e.g., for a particular consumer of the data center. Conventional techniques utilized to form and manage these data storage pools, however, are not scalable based on conventional limitations of metadata storage as part of the data storage pool.

SUMMARY

Scalable data storage techniques are described. In one or more implementations, data is obtained by one or more computing devices that describes fault domains in a storage hierarchy and available storage resources in a data storage pool. Operational characteristics are ascertained, by the one or more computing devices, of devices associated with the available storage resources within one or more levels of the storage hierarchy. Distribution of metadata is assigned by the one or more computing devices to one or more particular data storage devices within the data storage pool based on the described fault domains and the ascertained operational characteristics of devices within one or more levels of the storage hierarchy.

In one or more implementations, a system includes one or more modules implemented at least partially in hardware. The one or more modules are configured to perform operations that include adding a plurality of data storage devices to a data storage pool via a single transaction. Responsive to the addition, distribution of metadata within the data storage pool is assigned based on operational characteristics of each data storage device within the data storage pool.

In one or more implementations, a system includes one or more modules implemented at least partially in hardware. The one or more modules are configured to perform operations that include receiving an indication to rebalance distribution of metadata in a data storage pool and obtaining data that describes resiliency constraints specified for the data storage pool. Redistribution of metadata is assigned to one or more particular data storage devices within the data storage pool based on the described resiliency constraints.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 3 is a flow diagram depicting a procedure in an example implementation in which techniques are described to assign metadata to storage devices within a storage hierarchy by leveraging knowledge of fault domains within a data storage pool

FIG. 6 is a flow diagram depicting a procedure in an example implementation in which metadata is assigned and data storage devices are added to a data storage pool.

FIG. 8 is a flow diagram depicting a procedure in an example implementation in which metadata is rebalanced in a data storage pool.

DETAILED DESCRIPTION

Overview

Figure 1:
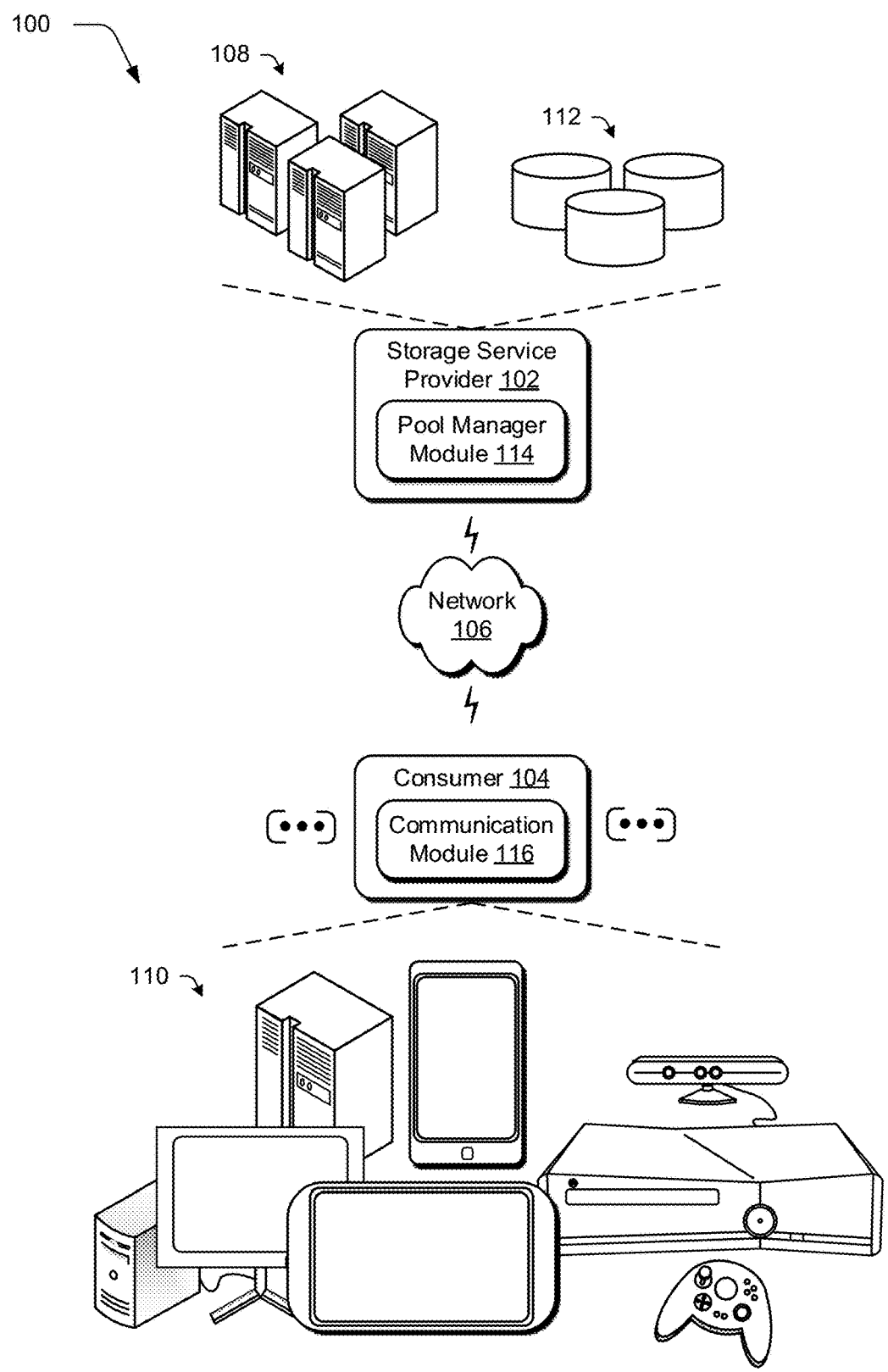
FIG. 1 is an illustration of an environment in an example implementation that is operable to employ scalable data storage pool techniques.

Scalable data storage techniques are described. In one or more implementations, techniques are described in which a maximum number of data storage devices (e.g., hard drives) in a data storage pool may be increased by placing metadata that describes "where" data may be found in the data storage pool on a subset of the data storage devices.

Assignment of which of the data storage devices are to receive the metadata may be based on a variety of considerations. For example, the assignment may be based on health, data connection type, media type, how used within the data storage pool, or current metadata status of the data storage devices. Additionally, fault domains within a data storage hierarchy may also be considered, such as how data is stored by the data storage devices and distribution of the data storage devices across data centers, racks, and enclosures. In this way, the data storage pool may protect against failures of devices at different levels within a storage hierarchy of the data storage pool. Further, a number of data storage devices as well as considerations such as number of fault domains to be used may be specified by resiliency constraints specified for the data storage pool.

Yet further, management of the data storage pool may utilize techniques in which parallelism is employed as part of adding or removing data storage devices from a data storage pool. For example, a plurality of data storage devices may be formatted in parallel using a plurality of threads and then added to the data storage pool as a single transaction. Similar techniques may also be employed for deleting data storage devices from the data storage pool.

Rebalancing techniques for assignment of metadata may also be employed by the data storage pools. For example, an indication may be received that a change is to be made in a distribution of metadata, such as from a user, due to addition, removal, failure of data storage devices or other devices in a storage hierarchy, and so on. In response, metadata may be rebalanced based on resiliency constraints of the data storage pool as well as other previously described considerations, such as operational characteristics, fault domains, and so on. Further discussion of these and other techniques may be found in relation to the following sections.

In the following discussion, an example environment is first described that may employ the scalable data storage pool techniques described herein. Example procedures are then described which may be performed in the example environment as well as other environments. Consequently, performance of the example procedures is not limited to the example environment and the example environment is not limited to performance of the example procedures.

The following discussion describes scalable data storage pool techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-8 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Example Environment

FIG. 1 is an illustration of an environment 100 in an example implementation that is operable to employ techniques described herein. The illustrated environment 100 includes a storage service provider 102 and a consumer 104 that are communicatively coupled via a network 106. Computing devices 108, 110 that may implement the storage service provider 102 and the consumer 104 may be configured in a variety of ways.

For example, computing devices 110 may be configured as a computer that is capable of communicating over the network 106, such as a desktop computer, a mobile station, an entertainment appliance, a set-top box communicatively coupled to a display device, a wireless phone, a game console, and so forth. Thus, the computing device 110 may range from full resource devices with substantial memory and processor resources (e.g., personal computers, game consoles) to a low-resource device with limited memory and/or processing resources (e.g., traditional set-top boxes, hand-held game consoles). Additionally, a computing device may be representative of a plurality of different devices, such as multiple servers utilized by a business to perform operations such as by the computing devices 108 of the storage service provider, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The storage service provider 102 is illustrated as including a plurality of data storage pools 112 that may be utilized to store data of the consumers 104 and/or the storage service provider 102 itself, e.g., when implemented as part of a web service such as to store photos of a social network service. Functionality involving management of the data storage pools is represented by a pool manager module 114. As previously described, this management may include selection of which data storage devices in a data storage pool 112 are to include metadata, further discussion of which may be found in relation to FIGS. 2 and 3. Management of the data storage pool 112 may also employ parallelism, such as to format and reformat data storage devices simultaneously, further discussion of which may be found in relation to FIGS. 4-6. Further, the pool manager module 114 may support metadata rebalancing techniques, such as in response to a user input, failure of devices in a data storage hierarchy, addition or removal of data storage devices, and so on as further described in relation to FIGS. 7-8.

Figure 2:
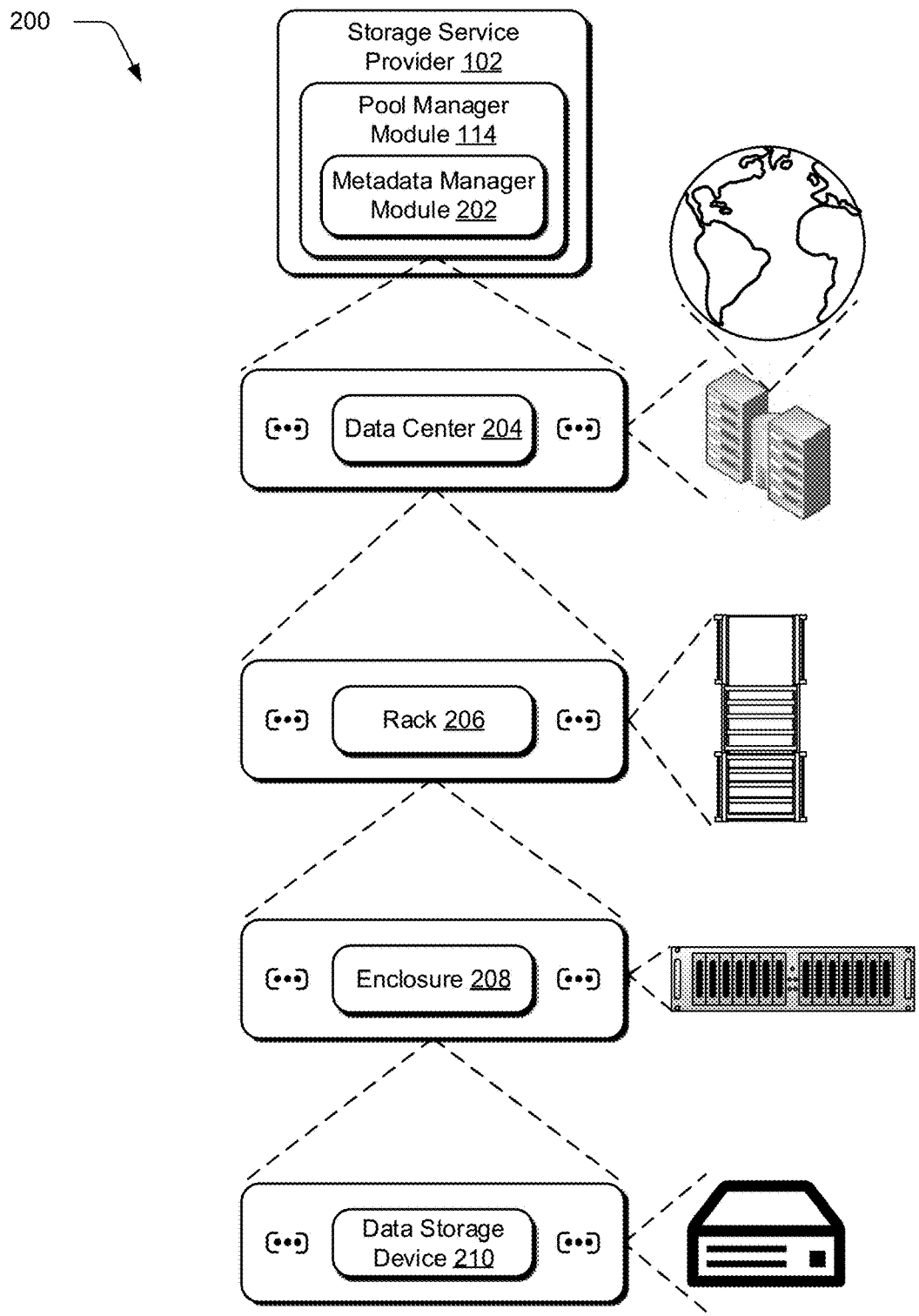
FIG. 2 depicts a system in an example implementation showing a storage hierarchy in which a data storage pool of FIG. 1 may be implemented.

FIG. 2 depicts a system 200 in an example implementation showing a storage hierarchy in which a data storage pool 112 of FIG. 1 may be implemented. The pool manager module 114 in this example is illustrated as including a metadata manager module 202 that is representative of functionality to select how metadata is assigned to a data storage pool.

The system 200 includes an example of a storage hierarchy that includes one or more data centers 204 that may be located at different geographic locations, and thus each data center 204 provides a fault domain in which failure of devices of the data center 204 (e.g., loss of power to a facility as a whole) at one geographic location may be overcome by availability of a data center at another geographic location.

Each of the data centers 204 includes a plurality of racks 206. Racks 206, for example, may be configured to include power and switching to house enclosures 208, which may also include power and switching to house data storage devices 210. Thus, racks 206 may also provide a fault domain in which failure at one of the racks 206 (e.g., a switch at the rack) may be overcome by another rack. Likewise, enclosures 208 within the racks may also provide a fault domain in that failure of one enclosure may be overcome with another such that if data is provided via multiple enclosures these copies may be used to tolerate failure. Yet further, data storage devices 210 may also provide fault domains in a similar manner through copies of data at multiple data storage devices 210. Other levels in the storage hierarchy are also contemplated that may provide fault domains, such as storage units, e.g., nodes.

Thus, devices within the storage hierarchy may provide fault domains that are usable to protect against failure of devices within those domains. Further, the fault domains may also be utilized hierarchically to further protect against failure of devices. Accordingly, the metadata manager module 202 may leverage knowledge of fault domains within a storage hierarchy of a data storage pool 112 of FIG. 2 to select which devices are to receive metadata that describes where data is stored in the data storage pool 112. For example, the metadata manager module 202 may use a specified resiliency constraint (e.g., a number of failures to be tolerated) to spread out metadata on a number of devices that meet this specified resiliency constraint and maximize fault domain usage of available resources within the storage hierarchy. Further discussion of this technique may be found in relation to the following procedure.

FIG. 3 depicts a procedure 300 in an example implementation in which techniques are described to assign metadata to storage devices within a storage hierarchy by leveraging knowledge of fault domains within a data storage pool. Data is obtained by a pool manager module 114 that describes fault domains in a storage hierarchy and available storage resources in a data storage pool (block 302). The pool manager module 114, for instance, as part of management of the data storage pool 112 of FIG. 1 may determine which data storage devices 210 are used to store data in the data storage pool 112. The pool manager module 114 may also determine other devices in the storage hierarchy that are employed as part of the data storage pool 112 and from this corresponding fault domains, such as enclosures 208, racks 206 and even different data centers 204 that may be employed to implement a data storage pool 112.

The pool manager module 114 may also ascertain operational characteristics of devices associated with the available storage resources within one or more levels of the storage hierarchy (block 304). This may include ascertaining operational characteristics of the data storage devices 210 as well as devices associated with other levels of the storage hierarchy, i.e., across different fault boundaries such as at an enclosure 208, rack 206, and data center 204 level.

A variety of different operational characteristics may be ascertained by the pool manager module 114. For example, health of devices (block 306) may be ascertained, such that this knowledge may be leveraged to choose healthy devices over non-healthy devices. A data connection type (block 308) may also be ascertained, such as to give greater weight to buses of data storage devices 210 of a particular type (e.g., NVMe over other bus types), types of data connections between enclosures 208 and rack 206, racks 206 and a data center 204, and so on. A media type (block 310) may also be ascertained for the data storage devices 210, e.g., such as to give a greater weight and thus likelihood of selection of SSDs over HDDs.

The pool manager module 114 may also ascertain how the device in the storage hierarchy is being used (block 312). For data storage devices 210, for example, types of usage may include auto-allocation in which the data storage device 210 is available to receive and store data as part of the data storage pool 112 generally, as opposed to manual types, journal types, hot spare types, and so on. In one or more implementations, each other type is given preference over retired types, e.g., the data storage device 210 is marked for removal from the data storage pool 112. A current metadata status (block 314) may also be ascertained, such that the pool manager module 114 may give greater weight (and thus preference) to data storage devices 210 and associated devices in the storage hierarchy that are currently being used to store metadata.

Distribution of metadata is assigned to one or more particular data storage device within the data storage pool based on the described fault domains and ascertained operational characteristics of devices within one or more levels of the storage hierarchy (block 316). The pool manager module 304, for instance, may be configured to give greater weight to these operational characteristics in the listed order, e.g., health, then data connection type, then media type, then how used, and then current metadata status. If each of these operational characteristics are equal for the data storage devices 210, the assignment of which data storage devices 210 are to be used for metadata may be randomly selected from that set. Additionally, fault domains may also be considered such that a number of fault boundaries is maximized based on available resources of the data storage pool 122, e.g., the utilize data storage devices 210 on different enclosures 208, racks 206, data centers 204, and so on when available.

A number of data storage devices 210 to be used to store metadata may be determined in a variety of ways. For example, resiliency constraints may be specified, such as a number of failures to be tolerated and a number of data storage devices 210 may be chosen based on these constraints, which may also be based on the storage hierarchy described above. For example, for one enclosure six metadata drives may be specified for the enclosure, for two to four enclosures three metadata drives may be specified per enclosure, for five to sixteen enclosures two metadata drives may be specified per enclosure, for greater than sixteen enclosures one metadata drive may be specified per enclosure, and so on. In each enclosure (or higher fault domain) suitable data storage devices 210 may be selected to have metadata starting from the most eligible device. If a desired number of eligible devices is not found, then a selection may be made to include as many eligible devices as possible. Further, these techniques may be stable in that if a data storage device 210 already has metadata it may continue to do so.

In this way, knowledge of storage topology as expressed in the storage hierarchy and operational characteristics of the devices in the hierarchy may be used to scope metadata storage to a particular subset of data storage devices 210 in a way that does not impact reliability guarantees as specified by resiliency constraints of the data storage pool 112. These features may also be employed as part of addition, removal of data storage devices 210 including rebalancing of metadata as further described below.

Figure 4:
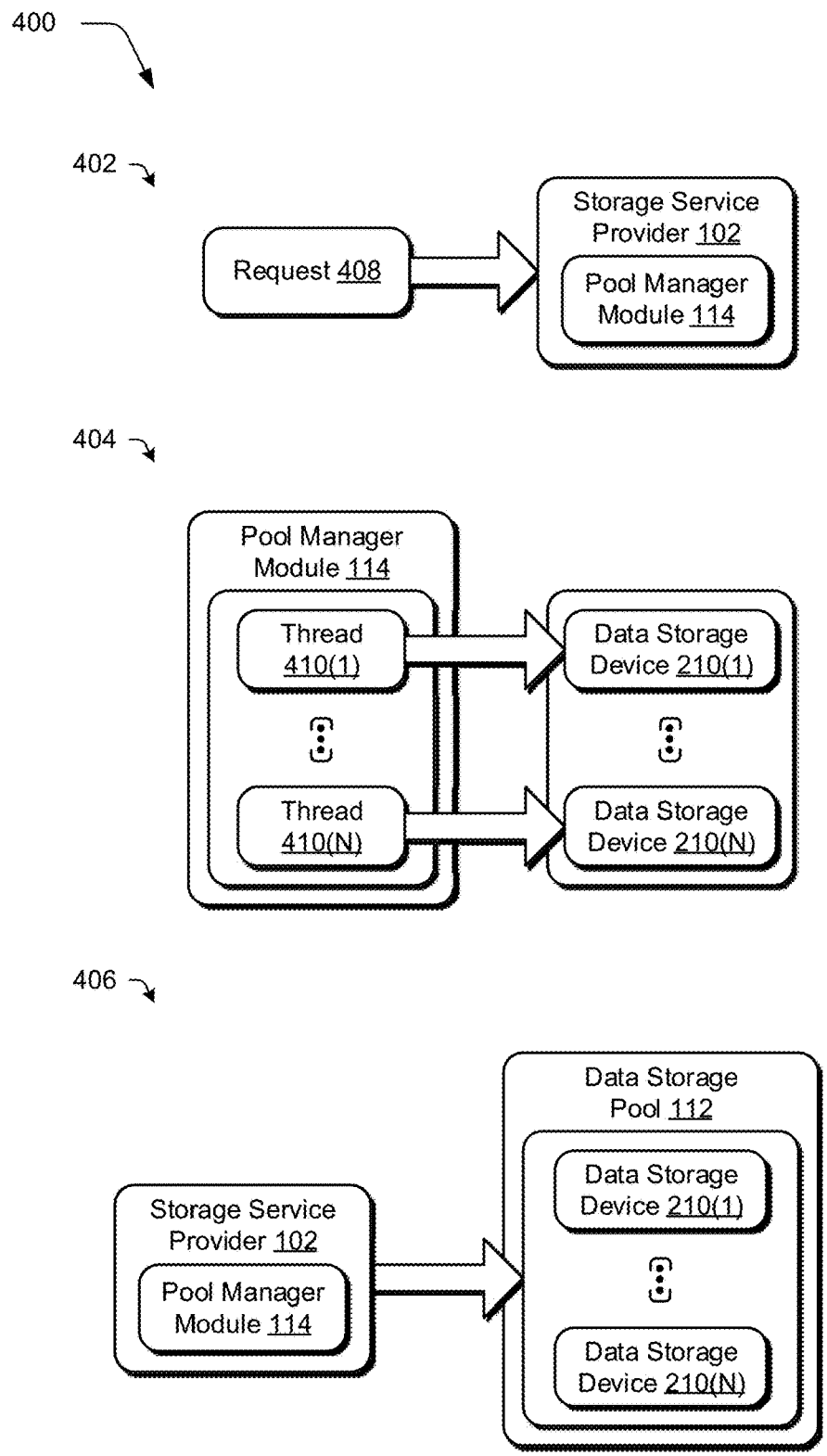
FIG. 4 depicts a system in an example implementation in which parallelism is employed by a pool manager module in management of data storage devices within a data storage pool.

FIG. 4 depicts a system 400 in an example implementation in which parallelism is employed by the pool manager module 114 in management of data storage devices within a data storage pool. When creating a data storage pool 112 or adding data storage devices 210 to an existing data storage pool using conventional techniques, a majority of time is spent formatting the data storage device 210 and performing transaction to add each of the data storage devices 210 to the data storage pool 112. In this example, however, parallelism may be employed to perform the formatting in parallel for pluralities of the data storage devices and then add those devices to the data storage pool via a single transaction, thereby reducing an amount of time it takes to create or add data storage devices 210 to a data storage pool 112.

For example, the system 400 of FIG. 4 is illustrated using first, second, and third stages 402, 404, 406. At the first stage 402, a request 408 is received by the pool manager module 114 of the storage service provider 102. The request 406, for instance, may originate with a consumer 104 utilizing a communication module 116 for access via a network 106, a technician associated with the storage service provider 102, and so on. Additionally, the request 406 may be configured to cause creation of a data storage pool 112, add data storage devices 210 to an existing data storage pool 112, and so on.

At the second stage 404, the pool manager module 114 employs parallelism to format a plurality of data storage devices 210(1)-210(N) in parallel. For example, the pool manager 114 may employ a plurality of threads 410(1)-410(N) such that each thread is utilized to format a corresponding data storage device 210(1)-210(N) simultaneously. This may include formatting of secure partitions and so on for each of the devices. If a number of data storage devices to be formatted is less than a number of available threads, this may be performed in one pass.

If not, a work queue may be employed such that once formatting by a thread is completed, another data storage device is chosen from the queue for formatting. For example, if thirty two threads are available but sixty four data storage devices are to be formatted, each of the thirty two threads may be utilized simultaneously and in succession to perform the formatting. However, if a thread completes formatting earlier it may also select a data storage device from a queue immediately such that none of the threads are idle if formatting tasks are to be performed. In this way, groups of threads may repeat the formatting as desired.

At the third stage 406, the formatted data storage devices 210(1)-210(N) from the second stage 404 are added to the data storage pool 112 in a single transaction, rather than employ a separate transaction for each individual data storage devices 210(1)-210(N) as is performed using conventional techniques. Thus, in this example parallelism and use of a single transaction may be employed to reduce an amount of time it takes to create or add data storage devices 210 to a data storage pool 112. This parallelism may also be performed in conjunction with metadata assignments, further discussion of which may be found in the following and is shown in corresponding figures.

Figure 5:
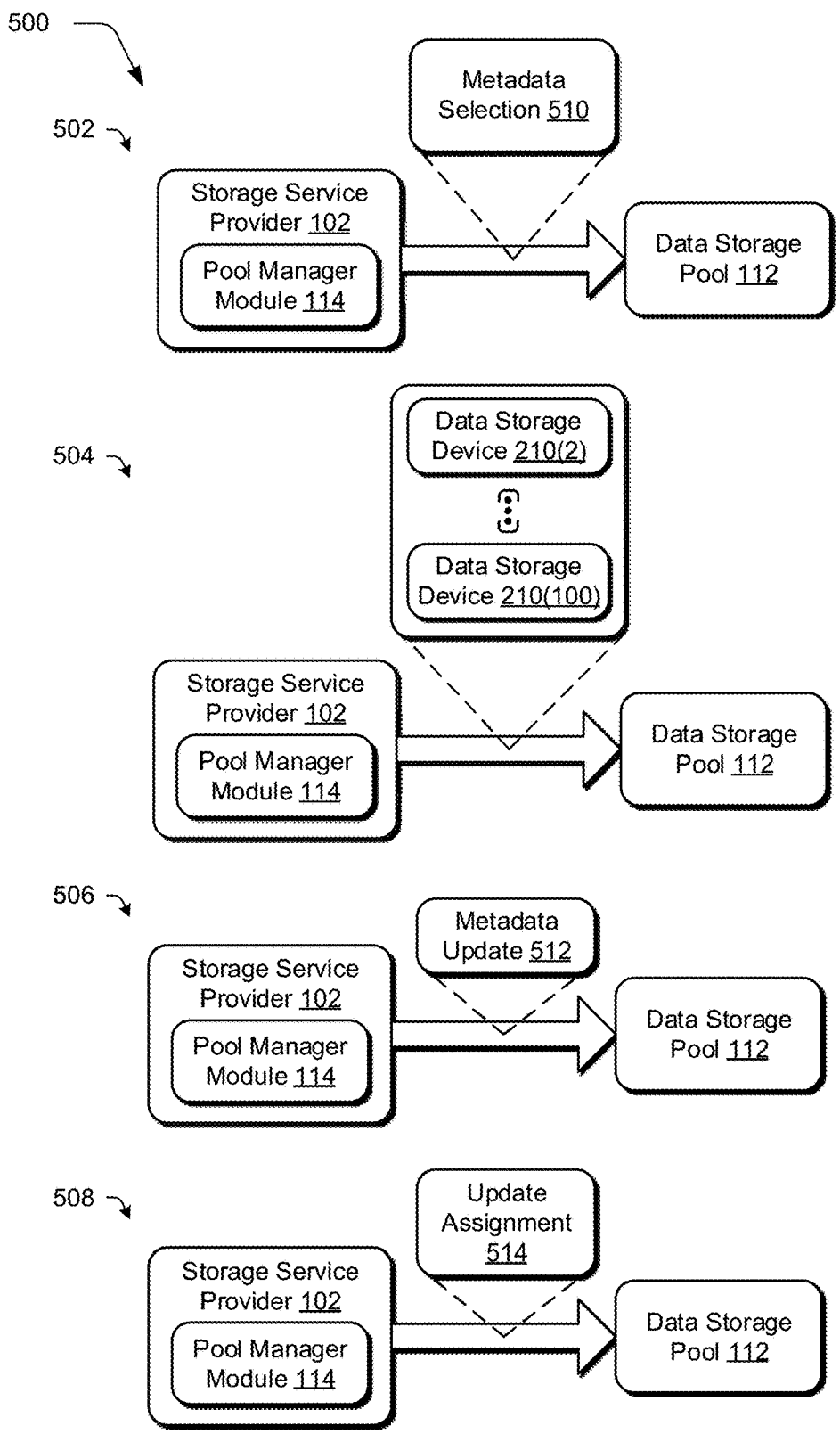
FIG. 5 depicts a system in an example in which metadata is assigned and data storage devices are added to a data storage pool.

FIG. 5 depicts a system 500 in an example in which metadata is assigned and data storage devices are added to a data storage pool. FIG. 6 depicts a procedure 600 in an example implementation in which metadata is assigned and data storage devices are added to a data storage pool. Accordingly, the following discussion refers to both FIGS. 5 and 6 interchangeably. A plurality of data storage devices are formatted using a plurality of threads simultaneously by one or more computing devices (block 602). A computing device implementing the pool manager module 114, for instance, may employ a plurality of threads to format a plurality of data storage devices 210(1)-210(N) as previously described in relation to FIG. 3.

First, second, third, and fourth stages 502, 504, 506, 508 are illustrated in the system 500 of FIG. 5. At the first stage 502, when creating a new storage pool one or more data storage devices of the storage pool are selected for use in storing metadata for the data storage pool 112. For example, a request may be made to add one hundred data storage devices to the data storage pool 112. Accordingly, one or more of those devices may be configured to store metadata for these additional devices and is added to the data storage pool 112.

Next, at the second stage 504 a plurality of data storage devices 210(2)-210(100) are added to the data storage pool via a single transaction by the one or more computing devices (block 606). Continuing with the previous example, the single transaction may be used to create the pool and write metadata to the selected drives.

In another example in which the data storage devices are added to an existing data storage pool, the single transaction may go to existing data storage devices that are used to store metadata to add these devices to the data storage pool. Accordingly, in such an instance at the third stage 506 a metadata update 512 is provided to the metadata storage device 508 of the data storage pool 112 in a single transaction such that these additional data storage devices 210(2)-210(100) as well as the metadata storage device 508 itself are included as part of the data storage pool 112.

At the fourth stage 508, an updated assignment 514 of metadata is performed for the data storage pool 112 to address these additional data storage devices and associated devices in a storage hierarchy. For example, distribution of metadata to one or more particular data storage devices within the data storage pool 112 may be assigned based on ascertained operational characteristics of the data storage devices within the data storage pool (block 610). For a scenario in which data storage devices are added to an existing pool, this may include operational characteristics of the data storage devices previously included in a data storage pool 112 as well as the additional data storage devices added to the data storage pool 112. This assignment may be performed in a variety of ways, such as by using the technique previously described in relation to FIGS. 2 and 3.

The metadata is then distributed to the one or more particular data storage devices according to the assigned distribution sequentially, one at a time (block 612). Following the previously scenario, if the data storage devices are added to an existing data storage pool, this distribution may be performed sequentially for the assigned particular data storage devices to protect against failure.

For example, in a "majority wins" approach if a failure is encountered during metadata distribution a voting technique may be performed to determine a state in which to set the data storage devices in the data storage pool, e.g., to "roll back" or move forward to the new assignment. In this way, a majority may be maintained by adding the devices sequentially. In a scenario in which a data storage pool 114 is being created, however, no such concerns are relevant and therefore the assigned particular data storage devices may receive the distributions of the metadata simultaneously, e.g., through parallelism as previously described.

Although addition of data storage devices 210 to a data storage pool 112 has been described, it should be readily apparent that these techniques involving parallelism and single transactions are equally applicable to removal of a plurality of data storage devices from the data storage pool. Continuing with the previous example, the added data storage devices may be utilized to replace existing data storage devices in the data storage pool 112. Consequently, the new devices are added first and metadata is redistributed. The devices to be removed may then be marked as retired, assignment of metadata may then be performed such that the metadata is removed from these marked devices, and parallelism through the use of threads may be employed to remove the retired devices from the data storage pool 112, reformatting of the devices, and so on. Thus, use of parallelism and single transaction may be used to improve efficiency and resource consumption by the data storage pool 112 and pool manager module 114 over conventional techniques.

Figure 7:
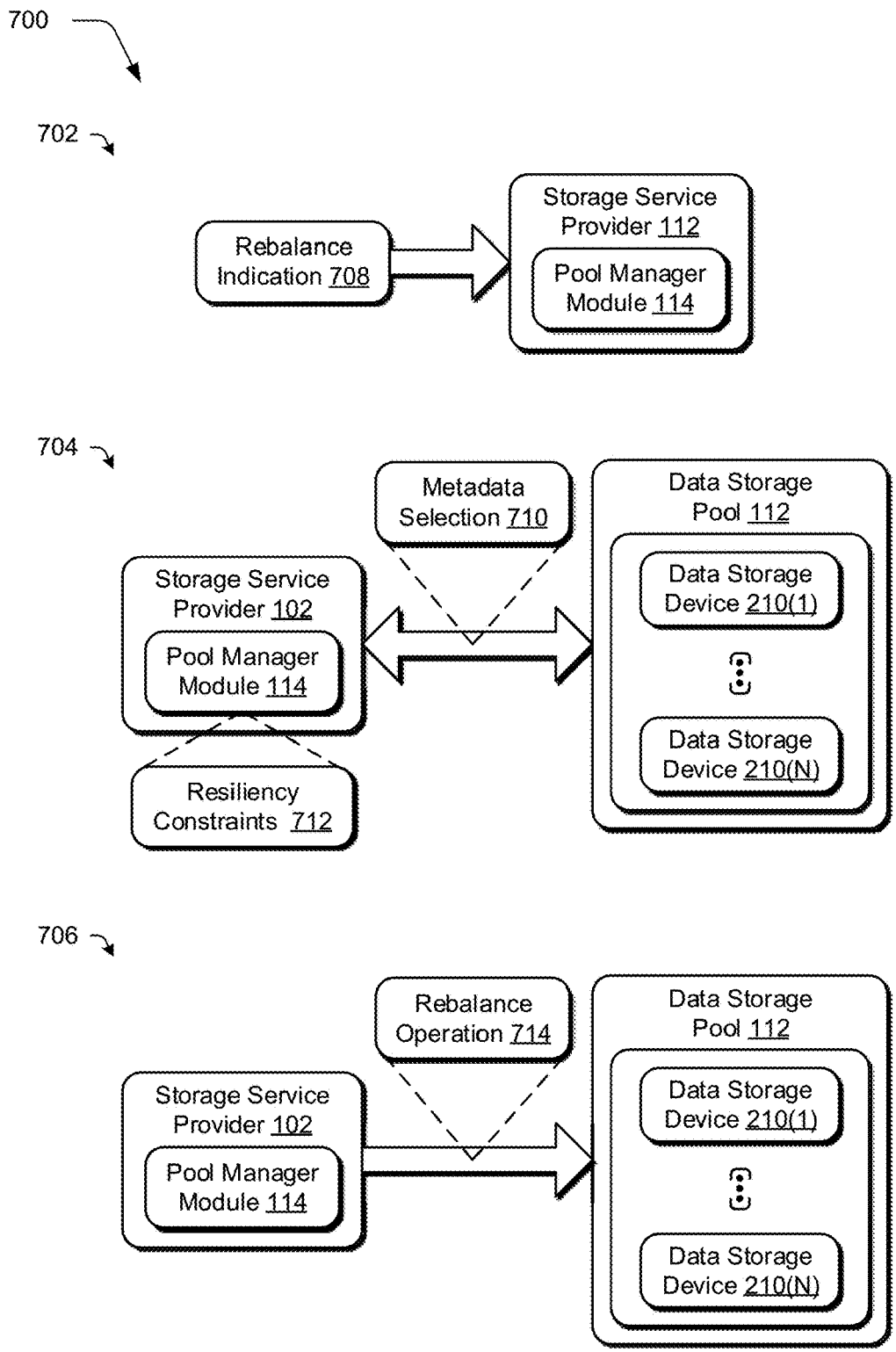
FIG. 7 depicts a system in an example in which metadata is rebalanced in a data storage pool responsive to an indication.

FIG. 7 depicts a system 700 in an example in which metadata is rebalanced in a data storage pool responsive to an indication. FIG. 8 depicts a procedure 800 in an example implementation in which metadata is rebalanced in a data storage pool. Accordingly, the following discussion refers to both FIGS. 7 and 8 interchangeably.

An indication is received by one or more computing devices to rebalance distribution of metadata in a data storage pool (block 802). At the first stage 702, for instance, a rebalance indication 708 is received by the pool manager module 114 of the storage service provider 112. The rebalance indication 708 may originate from a consumer 104 or technician as previously described, may be automatically generated responsive to detection of a failure, addition, or removal of devices within a storage hierarchy of a data storage pool 112 by the pool manager module 114, and so on.

Data is obtained that describes resiliency constraints specified for the data storage pool (block 804), such as a number of failures permitted, specified using defaults, and so on. Accordingly, redistribution of metadata may be assigned to one or more particular data storage devices within the data storage pool based on the described resiliency constraints (block 806). As previously described in relation to FIGS. 2-6, for instance, metadata selection 710 techniques may be employed to assign metadata to storage on particular data storage devices 210(1)-210(N) within a data storage pool 112 based on operational characteristics, fault boundaries, and so on. Additionally, resiliency constraints 712 may also be employed as part of this assignment, e.g., to specify a number of data storage devices to support a number of failures.

At the third stage 706, a rebalance operation 714 is performed, which may include use of transactions, parallelism, and so on as previously described it reassign the metadata in the data storage pool 112. In this way, management of the data storage pool 112 by the pool manager module 114 may address one or more of a plurality of different considerations to support scalability and performance goals.

Example System and Device

Figure 9:
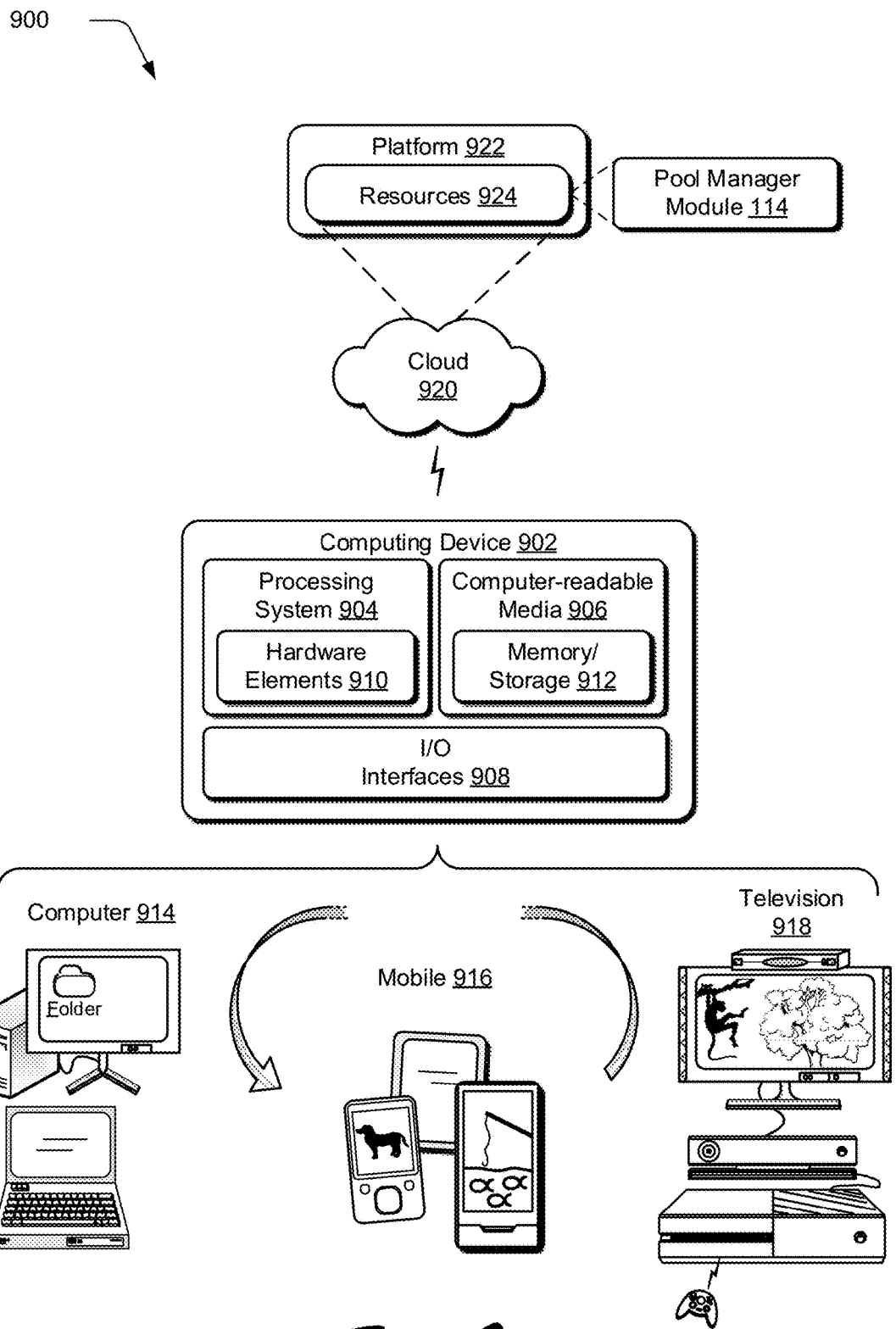
FIG. 9 illustrates an example system including various components of an example device that can be implemented as any type of computing device as described with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the pool manager module 114 as part of resources abstracted by a platform. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computer system comprising:
one or more processors; and
one or more computer-readable hardware storage devices having stored thereon computer-executable instructions which, when executed by the one or more processors cause the computer system to operate with an architecture that improves scalability of data storage at a data storage pool, and wherein the architecture causes the computer system to:
identify a data storage pool comprising a collection of devices that are organized based on a defined hierarchy, and wherein metadata used to access data stored on the collection of devices is stored within the collection of devices;
obtain resource data about the data storage pool's collection of devices, wherein the resource data comprises:
a description of a fault domain of the hierarchy; and
a description of resiliency constraints specified for the data storage pool;
select a set of devices from within the data storage pool, wherein selection of the set of devices is based, at least in part, on:
the description of the hierarchy's fault domain; and
the description of resiliency constraints specified for the data storage pool; and
re-distribute the metadata stored within the collection of devices by performing a metadata rebalancing operation in which the metadata is selectively assigned for storage on the selected set of devices in order to increase a number of devices in the data storage pool available for data storage.

2. The computer system of claim 1, wherein each of the descriptions for the devices includes a resource availability determination for a corresponding one device.

3. The computer system of claim 1, wherein determining which devices will be selected is also based on at least one of a device health determination, a data connection type determination, a media type determination, or a current device usage determination.

4. The computer system of claim 1, wherein determining which devices will be selected is also based on a determined availability of a device functionality, the device functionality including an auto-allocation functionality, a manual allocation functionality, a journal allocation functionality, or a hot spare functionality.

5. The computer system of claim 1, wherein determining which devices will be selected is based on a weighted list of device functionalities.

6. The computer system of claim 1, wherein execution of the computer-executable instructions further causes the computer system to perform one or more of the following on a particular device:
format the particular device;
cause the particular device to assist in performing the selected task such that the particular device is added to the data storage pool; or
cause the particular device to stop performing the selected task such that the particular device is removed from the data storage pool.

7. The computer system of claim 1, wherein determining which devices will be selected is also based on a resiliency constraint associated with each of the devices.

8. The computer system of claim 1, wherein determining which devices will be selected is also based on an operational characteristic of each of the devices.

9. The computer system of claim 1, wherein determining which devices will be selected is also based on whether any of the devices are currently storing metadata.

10. A method for improving scalability of data storage at a data storage pool, the method being performed by a computer system that includes one or more processors, comprising:
identifying a data storage pool comprising a collection of devices that are organized based on a defined hierarchy, and wherein metadata used to access data stored on the collection of devices is stored within the collection of devices;
obtaining resource data about the data storage pool's collection of devices, wherein the resource data comprises:
a description of a fault domain of the hierarchy; and
a description of resiliency constraints specified for the data storage pool;
selecting a set of devices from within the data storage pool, wherein selection of the set of devices is based, at least in part, on:
the description of the hierarchy's fault domain; and
the description of resiliency constraints specified for the data storage pool; and
re-distributing the metadata stored within the collection of devices by performing a metadata rebalancing operation in which the metadata is selectively assigned for storage on the selected set of devices in order to increase a number of devices in the data storage pool available for data storage.

11. The method of claim 10, wherein each of the descriptions for the devices includes a resource availability determination for a corresponding one device.

12. The method of claim 10, wherein determining which devices will be selected is also based on at least one of a device health determination, a data connection type determination, a media type determination, or a current device usage determination.

13. The method of claim 10, wherein determining which devices will be selected is also based on a determined availability of a device functionality, the device functionality including an auto-allocation functionality, a manual allocation functionality, a journal allocation functionality, or a hot spare functionality.

14. The method of claim 10, wherein determining which devices will be selected is based on a weighted list of device functionalities.

15. The method of claim 10, wherein determining which devices will be selected is also based on a resiliency constraint associated with each of the devices.

16. The method of claim 10, wherein determining which devices will be selected is also based on an operational characteristic of each of the devices.

17. The method of claim 10, wherein determining which devices will be selected is also based on whether any of the devices are currently storing metadata.

18. One or more hardware storage device(s) having stored thereon computer-executable instructions that are executable by one or more processor(s) of a computer system to cause the computer system to perform a method of improving scalability of data storage at a data storage pool, and wherein the method comprises:
  identifying a data storage pool comprising a collection of devices that are organized based on a defined hierarchy, and wherein metadata used to access data stored on the collection of devices is stored within the collection of devices;
  obtaining resource data about the data storage pool's collection of devices, wherein the resource data comprises:
    a description of a fault domain of the hierarchy; and
    a description of resiliency constraints specified for the data storage pool;
  selecting a set of devices from within the data storage pool, wherein selection of the set of devices is based, at least in part, on:
    the description of the hierarchy's fault domain; and
    the description of resiliency constraints specified for the data storage pool; and
  re-distributing the metadata stored within the collection of devices by assigning the metadata for storage on the selected set of devices in order to increase a number of devices in the data storage pool available for data storage, wherein after the metadata is spread out onto the selected set of devices, a metadata rebalancing operation is performed.

19. The one or more hardware storage device(s) of claim 18, wherein determining which devices will be selected is also based on an operational characteristic of each of the devices.

20. The one or more hardware storage device(s) of claim 18, wherein determining which devices will be selected is also based on whether any of the devices are currently storing metadata.

* * * * *